United States Patent

[11] 3,540,776

| | | |
|---|---|---|
| [72] | Inventor | Minor E. Wilson<br>Batavia, Ohio |
| [21] | Appl. No. | 781,697 |
| [22] | Filed | Nov. 29, 1968<br>Continuation of application Ser. No.<br>618,279, Feb. 17, 1967, abandoned |
| [45] | Patented | Nov. 17, 1970 |
| [73] | Assignee | Wilson Seat Company<br>Batavia, Ohio<br>a corporation of Ohio |

[54] SEAT CUSHION
4 Claims, 7 Drawing Figs.

[52] U.S. Cl................................................... 297/253,
297/4, 297/284
[51] Int. Cl............................................... A47c 27/10
[50] Field of Search............................297/Pneum.
dig., 253, 219, 230, 231, 382, 4, 284; 5/348

[56] References Cited
UNITED STATES PATENTS

| | | | |
|---|---|---|---|
| 1,576,211 | 3/1926 | O'Kane ........................ | 5/348 |
| 2,099,870 | 11/1937 | Stanley et al. ................ | 5/348 |
| 2,731,652 | 1/1956 | Bishop.......................... | 5/348 |
| 2,801,681 | 8/1957 | Crane........................... | 297/253 |
| 2,838,099 | 6/1958 | Warner ........................ | 5/348X |
| 3,042,941 | 7/1962 | Marcus......................... | 5/348 |
| 3,093,407 | 6/1963 | Wilson ......................... | 297/4 |
| 3,112,956 | 12/1963 | Schick.......................... | 297/382X |
| 3,145,054 | 8/1964 | Sopko .......................... | 297/Pn.D. |
| 3,253,861 | 5/1966 | Howard........................ | 297/Pn.D. |

FOREIGN PATENTS

| | | | |
|---|---|---|---|
| 596,787 | 8/1925 | France ......................... | 297/Pn.D. |
| 754,248 | 8/1956 | Great Britain................ | 297/Pn.D. |

Primary Examiner—Francis K. Zugel
Attorney—J. Warren Kinney, Jr.

ABSTRACT: The cushion embodies inflatable bags strategically located for maximum comfort in riding, by properly supporting various portions of the user's body. In one form, the inflatable bags are interconnected for self-equalization of pressure during use. Means may be provided for attachment of the cushion to user's body, or for retention of the cushion upon a vehicle seat when user leaves the vehicle. Featured also are light weight and simplicity.

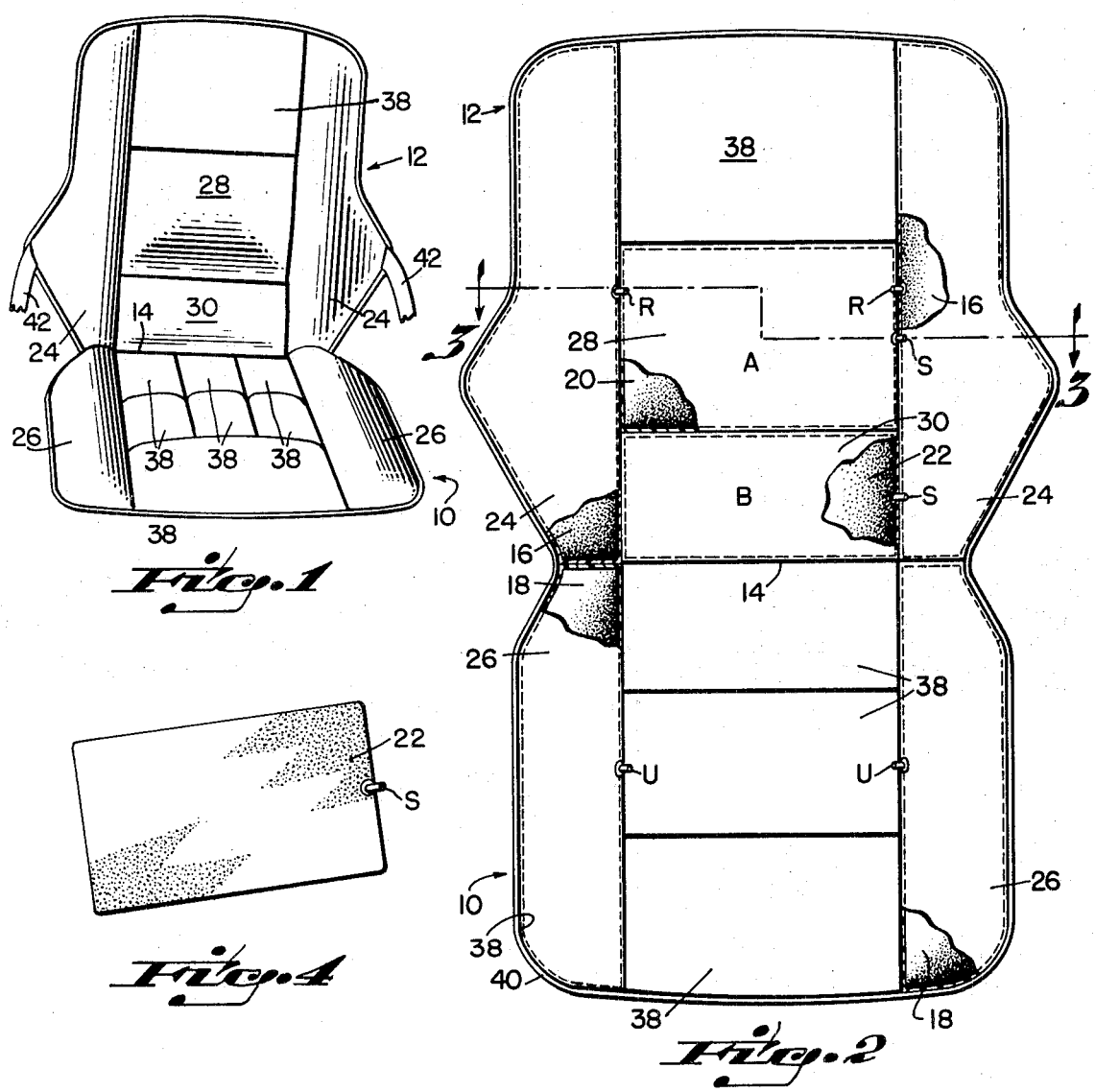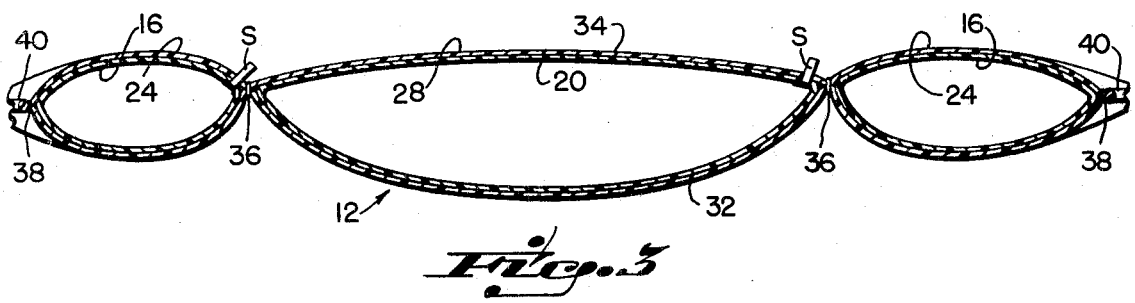

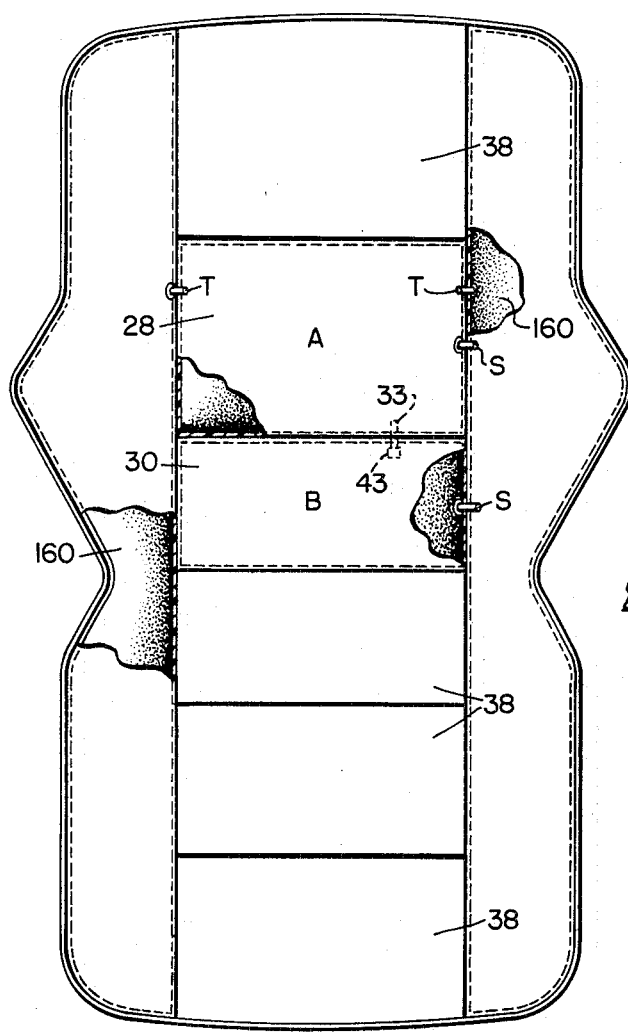
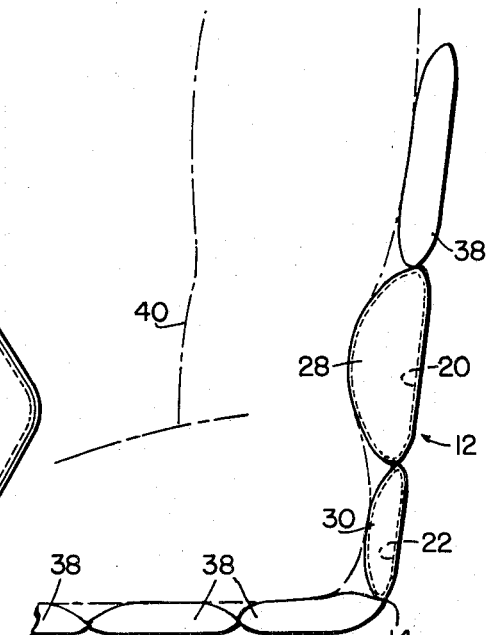
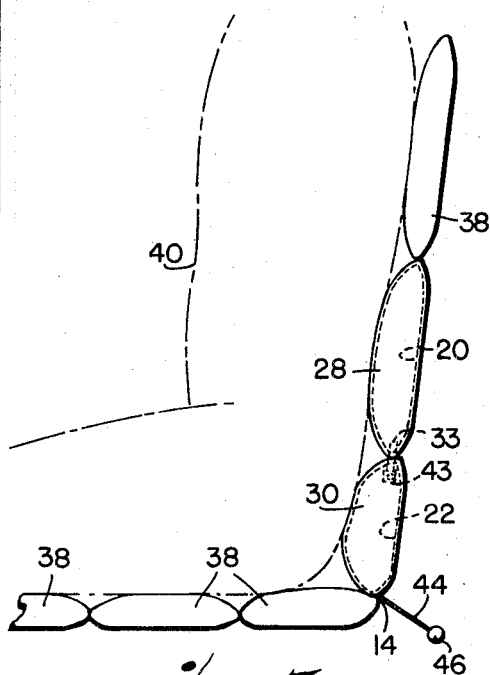
INVENTOR.
MINOR E. WILSON

SEAT CUSHION

This is a continuation of U.S. Pat. application Ser. No. 618,279 filed Feb. 17, 1967, now abandoned.

The present invention relates to a seat cushion. The cushion of this invention may be used as an accessory device for seats usually furnished in automotive vehicles including trucks and buses, and in boats, wheel chairs, office chairs and numerous other structures containing seats. For purpose of explanation only, and without intention to limit the invention thereto, the cushion will be disclosed as applied to a seat of an automotive vehicle, for example a truck, bus or passenger car.

It is commonly recognized fact that standard seats with which automotive vehicles are equipped, cannot provide satisfactory comfort for all types of persons who might occupy the vehicles, this being due, in part at least, to differences in physique of the occupants, or in their individual disabilities or requirements for support while traveling.

An object of the present invention is to provide an auxiliary seat or cushion so constructed as to be adjustable to the requirements of most vehicle occupants seeking comfort in traveling extensively, or for extended periods of time.

Another object of the invention is to provide a cushion device of the character stated, which is easily and completely adjustable for providing maximum comfort to the user, without imposing burdens of undesirable weight and bulk.

Another object is to provide in a cushion for the purpose stated, simple and effective means for the selective support of human body parts which in different people, require different degrees of support at different locations upon the body.

A further object of the invention is to provide a selectively inflatable vehicle seat cushion which is durable in service, yet inexpensive to manufacture.

The foregoing and other objects are attained by the means described herein and illustrated upon the accompanying drawings, in which:

FIG. 1 is a perspective view of the improved vehicle seat cushion of the invention, inflated for use.

FIG. 2 is a rear plan view of the same in partially deflated and flattened condition.

FIG. 3 is an enlarged cross section taken on line 3-3 of FIG. 2.

FIG. 4 is a plan view of an inflatable bag or insert forming a detail of the present invention.

FIG. 5 is a plan view of a modification.

FIGS. 6 and 7 are schematic diagrams indicating two modified forms of body support provided by the improved cushion.

The cushion device, as best illustrated by FIGS. 1 and 6, comprises generally a seat portion 10 and a back portion 12 hingedly joined along a line 14, for disposition at an angle to one another so as to approximately cover the seat area and the back rest of a conventional vehicle seat. Selected areas or panels of the seat portion and back portion are adapted to be distended by inflation with air or other gas under compression, according to the needs or desires of an individual user, as will be explained.

The seat and back portions may be constructed of any suitable material such as a textile fabric, plastic sheeting, or the like, preferably doubled wholly or in part, to provide certain pockets for receiving inflatable bags or inserts shown at 16-16, 18-18, 20 and 22. The pockets are numbered 24-24, 26-26, 28 and 30, and are formed between a top sheet 32 and a back sheet 34 of the cushion, by the application of stitching or other securing means joining the sheets, as at 36 of FIG. 3. The perimeter of the top and back sheets may be secured by means of stitching or other securing means indicated at 38, where a binding strip 40 also may be applied all around the cushion perimeter, if desired.

The pockets 28 and 30, FIG. 2, are separate from one another, and may contain the flexible or rubberlike inflatable bags 20 and 22. Bags 20 and 22 may be separately inflatable, (FIGS. 2 and 6) or they may be interconnected through a tube 33 according to FIG. 7.

Bag 20 when inflated, supports the small of the user's back at the approximate location of the waistline, whereas bag 22 when inflated furnishes support for the hips below the waistline. The extent of inflation of either or both bags in FIGS. 2 and 6 may be predetermined by the user for his own maximal comfort; that is, different degrees of inflation of bags 20 and 22 are possible in that form of the device depicted by FIGS. 2 and 6. The FIG. 7 construction may permit free transfer of air between bags 20 and 22 as the user's body 40 shifts and applies varying amounts of pressure thereto. Thus in FIG. 7, the inflatable bags may properly be considered automatically self-compensating at all times as to pressure of gas therein. Air or gas under pressure may be introduced into the bags through valve stems S. As is obvious, only one valve stem S is required where the bags are freely intercommunicating.

As a modification of FIG. 7, tube 33 may incorporate therein a check valve 43 precluding, or limiting, displacement of gas from bag 20 to bag 22. If the displacement mentioned is to be limited, rather than stopped completely, the check valve in tube 33 may be provided with a pinhole valve orifice to establish a slow transfer rate of gas from bag 20 to bag 22, this arrangement being effective to provide for a gradual automatic self-compensating of the bag pressures not immediately responsive to temporary shifting of the user's body weight.

The bags indicated at 16-16 are inflatable within the pockets 24-24, which provide side wings for the cushion in support of the sides of the user's body. The bags within the side wings preferably are individually inflatable through valve stems R. In the cushion construction depicted by FIG. 2, the inflatable bags 16, 16 for the side wings are located wholly above the seat portion 10. FIG. 5 shows a modification wherein the inflatable bags 160, 160, extend the full length of the cushion from the forward edge of the seat portion to the top edge of the back portion. Bags 160, 160 may be inflated or deflated through valve stems T. The pockets 28 and 30 of FIG. 5 may be in all respects similar to the corresponding pockets of FIGS. 2 or 7.

In the FIG. 2 construction, the inflatable bags 18-18 of pockets 26 flanking the sides of seat portion 10, may be inflated or deflated through valve stems U, individually and according to the user's judgment or preference.

Those areas of the cushion back and seat portions not to be provided with inflatable bags, may be appropriately padded if desired, using any acceptable padding material suitable for the purpose. Such likely areas are indicated by the reference numerals 38.

As FIG. 1 clearly suggests, the side wings may carry straps 42 anchored thereto and adapted for securing the cushion assembly to the body of the user. The straps may be secured at their free ends about the waist or abdomen of the user, by means of a suitable buckle or other strap connector of conventional type.

The reference numeral 44 (FIG. 7), indicates a short tongue of flexible material anchored at one end to the cushion, preferably in the area of hinge 14, to be inserted in the constricted space sometimes provided between the seat portion and the back rest of a vehicle seat. The tongue may carry at its free end a head member in the form of a rib, bar, or knob 46, which after insertion into the space mentioned, affords limited resistance to withdrawal of the tongue from said space. The headed tongue therefore may serve to retain the cushion in position relative to the vehicle seat, should the user desire to leave the vehicle after unbuckling the body straps 42. The retaining tongue and the body straps may be applied to all forms of the cushion disclosed, if desired.

From the foregoing explanation, it will be understood that the improved cushion of the invention, is applicable to users in a broad range of weights and sizes, to afford maximum comfort during extended automotive vehicle trips. The cushion may be used by passengers as well as drivers of vehicles. Under proper circumstances, users of the cushion may permit it to remain strapped onto the body when leaving a vehicle if desired, since the device is light in weight and not bulky. Use of the cushion avoids fatigue and weariness to a marked degree.

It is to be understood that various modifications and changes may be made in the structural details of the device, and in the materials employed therein, within the scope of the appended claims, without departing from the spirit of the invention.

I claim:

1. An inflatable seat cushion to be placed upon and readily separable from a seat, comprising a seat portion and a back portion each comprising a plurality of elongated transversely extending aligned rectangular closed pockets hingedly joined along longitudinal edges, said pockets being of substantially equal length in their longitudinal dimension and varying in their width dimension from the front to the back of said seat portion and from the bottom to the top of said back portion, a separate inflatable bag in each of at least the two bottom most pockets in said back portion, said inflatable bags substantially commensurate in size with said pockets, suitable padding means in each of the remaining pockets comprising the seat portion and the back portion, a pair of seat side portion pockets extending transversely along opposite ends of said seat portion pockets and hingedly joined along one side thereof to the ends of said seat portion pockets, a pair of back side portion pockets extending transversely along opposite ends of said seat portion pockets and hingedly joined along one side thereof to the ends of said seat portion pockets, a pair of back side portion pockets extending transversely along opposite ends of said back portion pockets and hingedly joined along one side thereof to the ends of said back portion pockets, said seat portion side pockets and said back portion side pockets hingedly joined to one another at their adjacent ends, an inflatable bag in each of said side portion pockets, and means for introducing fluid into each of said inflatable bags to inflate them.

2. The cushion as specified by claim 1, wherein the inflatable bags of the transversely extending pockets of the back portion are interconnected for free transfer of a gas from one bag to another as force is applied unequally thereto by movement of a user's body, thereby to automatically equalize pressure of gas within the bags.

3. The cushion as specified by claim 1, wherein the inflatable bags of the transversely extending pockets of the back portion are separately and individually inflatable at different pressures for the comfort of individual users.

4. The cushion as specified by claim 1, wherein is included a flexible tongue having an end secured to the cushion in the general area of the hinged interconnection between the seat portion and the back portion of the cushion, said tongue being insertable in a constricted space between the back rest and the seat portion of a conventional seat structure, and an enlargement on the free end of said tongue opposing withdrawal of the tongue from said space.